P. D. Bartlett,
Brick Machine.
Nº 11,465. Patented Aug. 8, 1854.
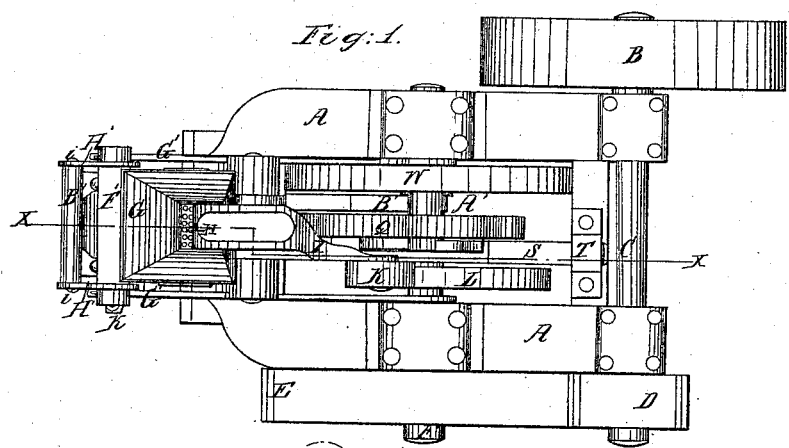
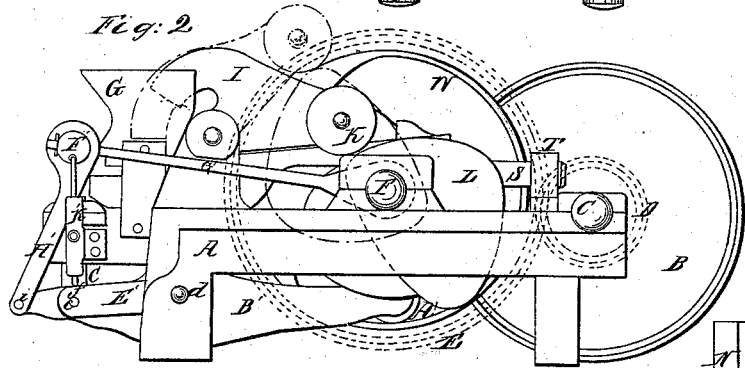
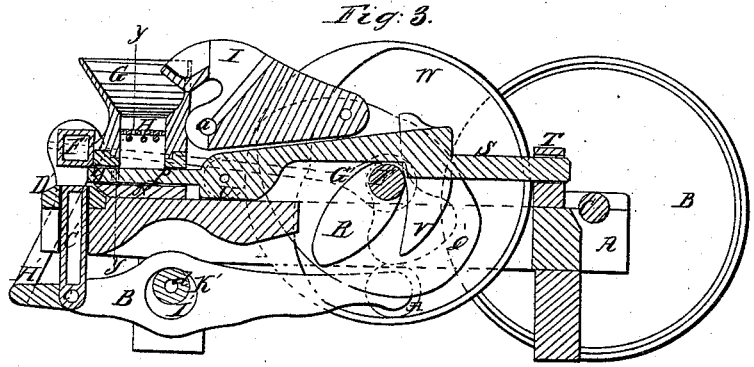
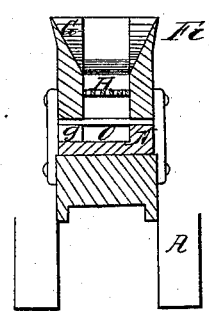

UNITED STATES PATENT OFFICE.

R. D. BARTLETT, OF BANGOR, MAINE.

MACHINE FOR MAKING BRICKS.

Specification of Letters Patent No. 11,465, dated August 8, 1854.

*To all whom it may concern:*

Be it known that I, R. D. BARTLETT, of Bangor, in the county of Penobscot and State of Maine, have invented certain new and useful Improvements in Machines for Making Bricks, of which the following is a full, clear, and exact description, reference being had to the annexed drawings, making part of this specification, in which—

Figure 1 is a plan of my machine. Fig. 2, a side view, the driving gear being indicated by red lines. Fig. 3, a longitudinal section upon the line X, X, of Fig. 1. Fig. 4, a transverse section upon the line Y, Y, of Fig. 3. Figs. 5, 6, 7, 8, 9, views of detached portions of the machine which will be referred to hereafter.

Bricks have heretofore been made of clay in one or the other of two opposite states; either "tempered," or kneaded with water, until it was made very plastic and pliable, or else thoroughly dried and reduced to powder. In the former case the bricks, when first molded, contain so much water, that it is necessary to spread them upon carefully prepared floors to dry, before they can be disposed of in sheds: the expense of this part of the process is considerable, and the bricks made from clay thus tempered are rendered porous and deficient in strength by the evaporation of the large quantity of water which they contain. Furthermore it is not found practicable to submit them to any considerable degree of pressure, when they are first made. Where it is desired therefore to produce superior bricks, either as regards beauty of exterior or density of body; after being molded as above of plastic clay they are suffered to dry by exposure to the air for several days and are again passed through another machine by which they are submitted to great pressure in polished iron or steel molds, and are thus rendered smooth upon the surface and of dense texture; this is however quite expensive and is a process never adopted except for the best "face bricks." Where dry clay is made use of it is allowed to desiccate either in the sun or under cover, and is then ground to powder, and forced, under great pressure, into molds of polished iron or steel. Bricks thus made may be carried direct from the mold to the kiln, and considerable time and labor is thus economized. It is found, however, that the air which is contained between the particles of powdered clay, and which is very powerfully compressed, when the brick is formed, again expands when it is relieved from pressure, and thus the strength of the brick is greatly impaired, and consequently an inferior article can only be made by this process.

Machines for making bricks have heretofore been contrived to operate upon clay in one or other of these two states.

The object of my present invention is to make use of clay as it comes from the bank, untempered and unground, and which is free from the excessive moisture of tempered clay and from the air contained in the pores of that which is dry and powdered; and my invention consists in a peculiarly contrived and constructed machine, by the use of which I am enabled to make use of clay in the stiff and compact state in which it comes from the bank, without tempering, grinding or preparation of any nature whatever, and to produce a brick far stronger and more compact than those made with tempered clay, and which may be carried directly from the mold to the shed, thus entirely avoiding two heavy items of expense, the "tempering" and "offbearing," as well as the waste which occurs from exposure to rain and other casualties while upon the drying floor. The bricks, thus produced, are also entirely free from the objections to which those made from dry powdered clay are liable, as the stiff clay, as it is dug, is almost entirely free from air, which is the occasion of the porous brittle nature of the dry clay bricks.

To enable others skilled in the art to make and use my invention, I will proceed to describe the method which I have adopted of carrying it out.

A, is the frame work of the machine. B, the driving pulley. C, the main driving shaft.

D, is a cogwheel upon the shaft C, which engages with the cogwheel E, upon the shaft F. Upon this shaft are placed all the cams which effect the different movements and operations of the machine.

I will first describe these movements and operations separately, and then give the general operation of the machine. The first of these operations in order, is that by which the clay is freed from the stones which it may contain, and forced into the mold.

G, is a hopper into which the clay is thrown a shovelful at a time. At the bottom of this hopper is a strong metallic grating, H, which receives the clay, and through which it is forced in a manner which will now be explained.

I, is a lever or squeezer of the form represented in Fig. 2, which is allowed to vibrate around a pivot $a$.

K, is a roller attached to the lever I, as seen in Figs. 1 and 2, and which rests upon the cam L, as this cam revolves with the shaft F, to which it is secured, it alternately raises the lever I, into the position represented in blue in Fig. 2, and allows it to return into the position seen in Figs. 1 and 3. If now a portion of clay in the state in which it is taken from the bank be thrown into the hopper while the squeezer is in this latter position (Fig. 3,) it will be forced through the grating into the space beneath, as seen at M, Fig. 6, upon the next half revolution of the cam L. Immediately beneath the grating H, is the mold N, seen in plan in Fig. 5, and in section in Figs. 3, 4, 6 and 7. Longitudinally through the center of this mold slides the plunger P, which is shown in two extreme positions in Figs. 3 and 7; and detached in Fig. 9. This plunger is operated in the following manner, (Figs. 1, 3 and 7,). Q, R, is a double cam, the two parts Q and R being secured together. S, is a horizontal lever which slides in a stand and T. The lever S is secured to the plunger P, and carries a roller W, against which the cam Q, operates, for the purpose of advancing the plunger and a projecting piece V, against which the cam R, operates to retract the plunger. The cam Q is so formed as to communicate two distinct motions to the plunger P, the one to give the preliminary pressure to the clay within the mold N, the other to expel the newly formed brick therefrom, preparatory to its receiving a final pressure from lever B, Fig. 6, as will now be explained. W, is a disk having a cam groove upon its interior surface in which works the roller A', upon the end of the lever B', seen in detached plan in Fig. 8. C', is a hollow plunger which is pivoted to the lever B', at $c$, and which slides in a secondary mold being seen in its two extreme positions in Figs. 3 and 6.

E', Figs. 1 and 2, are two shackle bars which connect the pivots $c, d$, and thus aid to preserve the lever B', in its proper position. F', is a hollow rectangular prism which serves as a bulk head simultaneously to each of the molds. It is connected with the shaft F, by the shackle bars G' and with the lever B', by the shackle bars H'. It will be perceived that these connections prevent the bulk head from yielding either horizontally or vertically except as it is governed by the motion of the parts with which it is connected. I', is a hole in the lever B', sufficiently large to give this lever considerable play round its pivot K'. It is evident that when the lever B', bears upon its pivot K', as seen in Fig. 3, that this pivot becomes its center of motion and the parts C', F', move together; when, however the lever B', is raised, as seen in Fig. 6, so as not to bear upon the pivot K, the point $c$ becomes its center of motion and the plunger C', and the bulkhead F', have a motion with respect to each other.

Where clay is used in the state in which I employ it in this machine there is a great tendency to adhere to the molds, and it is necessary to have some efficient mode of preventing it; this I have discovered may be accomplished by heating the parts which come in contact with the clay by means of steam in the following manner: K', is a steam pipe having branch pipes, $e, f$, leading to the bottom plunger and bulkhead C', F', and connected with the main steam pipe K' by stuffing boxes; by this means a current of steam is admitted to the interior of the plunger and bulkhead, and they are kept at the requisite temperature to prevent the adhesion of the clay.

Some method of gaging the quantity of clay required for each brick is very desirable; but no efficient method of accomplishing this has ever been devised with which I am acquainted. In the dry clay machines particularly there was a liability to constant variation in the amount of clay fed to the molds. I have succeeded in accomplishing this in the most perfect manner, and in gaging accurately the quantity of clay for the formation of each brick, in the following manner: Through one side of the brick mold N, I open a passage $g$, through which, when the requisite degree of pressure has been put upon the clay, the excess is allowed to pass, and while, as is evident, the pressure must be very great before untempered clay will be forced out of this opening, it is also evident that when the pressure reaches a certain point which will be uniform, all further motion of the plunger tends only to force the clay out through the opening in the mold. A uniform pressure is thus secured upon each brick, the bricks all containing a uniform amount of clay. The clay, crude and untempered, is thrown into the hopper in small quantities when the squeezer I, is in the position represented in Figs. 1 and 3, and in black in Fig. 2; by the revolution of the shaft F, and cam L, the squeezer is thrown into the position seen in blue in Fig. 2, by which means the clay is forced through the grating into the space below, as seen at M, in Fig. 6. The plunger being withdrawn, as seen in Figs. 6 and 7, the cavity in the mold is filled with clay. The plunger T, now commences to advance, the bulkhead F, being in the position seen in Fig. 6. As the plunger T advances the clay is compressed between it and the bulkhead F', the excess of clay being forced out through the opening g, in the mold. The plunger T, now remains stationary while the bulkhead is raised into the position seen in Fig. 3, the plunger C', having at the same time risen to the surface of the mold D'. The plunger T, now again advances and the brick is thrown forward onto the end of the plunger C', the lever B', now begins to move in obedience to the cam groove in the disk W, and the plunger C', descends into the mold D', F', following it until it rests upon the top of the mold D'; the point i, now becomes the fulcrum of the lever B', and the plunger C', commences to rise again compressing the bricks (b, Fig. 6,) between it and the bulkhead F'. The roller A' now descends again in its cam groove, the first consequence of which is to raise the bulkhead F', from contact with the finished brick, the lever B', turning upon the point c, as a center; the lever B', then commences to bear upon its fulcrum K', and the plunger C', is raised and with it the finished brick, ready to be taken out of the machine. The operations then succeed each other as before. The squeezer I, descending into the hopper, the plunger advancing to give the preliminary pressure to a brick, and the final pressure being given to another brick, each time the shaft F, revolves.

Having thus described my invention, what I claim as my invention and desire to secure by Letters Patent is—

1. Making bricks of crude, untempered and unground clay by the means herein described, or by any other means substantially equivalent thereto.

2. I claim the manner herein described of forcing the clay in the state in which it is dug through the grating H, in small quantities at a time, by which means it is freed from the stones which it may contain, and prepared to be acted upon by the plunger, in the manner set forth.

3. The method of accurately gaging the quantity of clay in each brick, and of submitting them all to a uniform pressure, by means of the hole in the side of the mold as described.

4. The manner of arranging and operating the bulkhead F', by which it is enabled to assist simultaneously in the formation of two bricks, one in each mold.

5. The combination of the bulkhead F, and the plunger C', with the lever B', constructed and arranged as described, the lever having sufficient play upon its fulcrum to enable it to operate in the manner and for the purpose set forth.

6. I claim making the parts of the mold hollow, and heating them with steam in the manner described and for the purpose set forth.

R. D. BARTLETT.

Witnesses:
S. G. B. COOMBS,
DANL. HINCKLY.